(12) United States Patent
Ootsuki et al.

(10) Patent No.: US 6,290,056 B1
(45) Date of Patent: Sep. 18, 2001

(54) CONVEYING APPARATUS FOR CONVEYING MAGNETIC WORKPIECES

(75) Inventors: Katsumi Ootsuki, Toyama; Teruo Okawa; Masatoshi Kajiwara, both of Shiga-ken, all of (JP)

(73) Assignee: Murata Manfacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 09/391,004

(22) Filed: Sep. 7, 1999

(30) Foreign Application Priority Data

Sep. 7, 1998 (JP) .................................................. 10-252271

(51) Int. Cl.⁷ .................................................. B65G 35/00
(52) U.S. Cl. ........................................ 198/619; 198/690.1
(58) Field of Search ................................ 198/690.1, 619, 198/676, 657, 725

(56) References Cited

U.S. PATENT DOCUMENTS 5,816,385 * 10/1998 Ootsuki et al. .................... 198/690.1
5,848,684 * 12/1998 Furlani et al. ..................... 198/690.1
5,881,649 * 3/1999 Hasegawa et al. ................... 198/619

FOREIGN PATENT DOCUMENTS 7-35388   8/1995 (JP) .
9-199516  7/1997 (JP) .

* cited by examiner

*Primary Examiner*—Kenneth W. Noland
(74) *Attorney, Agent, or Firm*—Burns, Doane, Swecker & Mathis, LLP

(57) ABSTRACT

A conveying apparatus capable for conveying a magnetic workpiece at high speed with low vibration and low noise, superior in durability, and capable of achieving a reduction in driving force. The conveying apparatus includes a non-magnetic rail having a guide surface for slidably guiding a first surface of a workpiece, a non-magnetic belt having a conveying surface in contact with a second surface of the workpiece and movable along the rail, driving means for running the non-magnetic belt in circulation, and a rotatable roller whose peripheral surface is in contact with the surface of the non-magnetic belt opposite to the feeding surface. Provided in the roller is a magnet adapted to generate a magnetic force having a component force for causing the second surface of the workpiece to be attracted to the roller through the intermediation of the non-magnetic belt and a component force for bringing the first surface of the workpiece into contact with the rail.

19 Claims, 2 Drawing Sheets

CONVEYING APPARATUS FOR CONVEYING MAGNETIC WORKPIECES

Priority is claimed under 35 U.S.C. § 119 to Japanese Patent Application No. 10-252271 filed in Japan on Sep. 7, 1998, the entire content of which is hereby incorporated by reference.

BACKGROUND OF THE INVENTION

1. Field of the Invention

The present invention relates to a conveying apparatus and, in particular, to a conveying apparatus suitable for conveying magnetic workpieces such as lead frames.

2. Description of the Related Art

As a conventional example of a lead frame conveying apparatus, a guiding apparatus has been proposed in Japanese Utility Model Publication No. 7-35388, in which a lead frame is guided along the upper surface of a non-magnetic guide rail and in which a non-magnetic guide member is provided at one side edge of the upper surface of the guide rail. The apparatus also has magnets embedded in the guide member at appropriate intervals. In this apparatus, the side edge of the lead frame is attracted by the magnetic force and kept in contact with the guide member, so that a high level of positional accuracy can be achieved. Further, there is no need to provide a device for preventing the lead frame from going backward or a device for imparting tension.

In the above-described apparatus, however, it is necessary to employ transfer means such as a transfer lug for transferring the lead frame, and it is difficult to perform high-speed conveying with low vibration and low noise. Further, since the lead frame is in close contact with the guide member, there is frictional resistance between the lead frame and the guide member. When the transfer lug is engaged with the lead frame to transfer the lead frame, a large load is partially applied to the lead frame, and there is a danger of the lead frame being expanded or deformed.

To solve the above problem, U.S. Pat. No. 5,816,385 proposes a conveying apparatus capable of conveying a magnetic workpiece at high speed with low vibration and low noise and allowing high-accuracy positioning to be effected. This conveying apparatus serves to convey a magnetic workpiece having two adjacent surfaces. The apparatus comprises a non-magnetic rail having a guide surface for slidably guiding a first surface of the workpiece. The conveying apparatus also comprises a non-magnetic belt having a conveying surface in contact with a second surface of the workpiece and movable along the rail and driving means for running the belt. The conveying apparatus further comprises a magnet which is arranged at a position opposed to the rail through the intermediation of the belt and which generates a magnetic force including a component force for bringing the second surface of the workpiece into close contact with the belt and a component force for bringing the first surface of the workpiece into contact with the rail.

In the above conveying apparatus, the magnetic workpiece is conveyed in a state in which it is attracted to a magnet (yoke) through the intermediation of the non-magnetic belt. When conveying a workpiece requiring a large magnetic force, the friction between the non-magnetic belt and the magnet (yoke) increases. This friction leads to wear of the non-magnetic belt and the magnet (yoke) which results in a deterioration in durability and a degeneration in conveying position accuracy of the apparatus. Furthermore, a large driving force is required to drive the belt.

The wear on the non-magnetic belt and the magnet (yoke) may be avoided to some extent by performing low-friction surface treatment on the sliding surface of the non-magnetic belt or the yoke, or applying oil for lubrication. These solutions, however, are not permanent measures to solve the problem.

SUMMARY OF THE INVENTION

Accordingly, it is an object of the present invention to provide a conveying apparatus capable of conveying magnetic workpieces at high speed with low vibration and low noise, superior in durability, and contributing to a reduction in driving force.

To achieve the above-described object, according to a first aspect of the present invention, there is provided an apparatus for conveying a magnetic workpiece having two adjacent surfaces, comprising a non-magnetic rail having a guide surface slidably guiding a first surface of the workpiece, a non-magnetic conveying member having a conveying surface in contact with a second surface of the workpiece and movable along the rail, driving means for running the non-magnetic conveying member, a rotatable roller whose peripheral surface is in rolling contact with a surface opposed to the conveying surface of the magnetic conveying member, and a magnet incorporated in the roller and adapted to generate a magnetic force having a component force for causing the second surface of the workpiece to be attracted to the roller through the intermediation of the non-magnetic conveying member and a component force for bringing the first surface of the workpiece into contact with the rail.

The second surface of the workpiece is attracted to the conveying surface of the workpiece by the magnet, so that, when the non-magnetic conveying member is moved along the rail by the driving means, the workpiece moves integrally with the non-magnetic conveying member. At this time, the first surface of the workpiece is slidably guided by the guide surface of the rail, so that the workpiece is conveyed while maintaining a stable attitude. The back surface of the non-magnetic conveying member, that is, the surface opposed to the conveying surface, is supported by the roller so that it can roll, so that the conveying member does not slide on the magnet (yoke). Since the conveying member does not slide on the magnet (yoke), wear of the conveying member and the magnet can be prevented. Further, since there is substantially no friction between the conveying member and the roller, it is possible to reduce the driving force for driving the belt. During conveying, the workpiece moves in contact with the non-magnetic member, so that concentration of load on a part of the workpiece does not occur. Thus, it is possible to convey the workpiece at high speed without applying excessive load to it, whereby deformation and deflection of the workpiece can be prevented.

When the non-magnetic conveying member is stopped abruptly, there is a danger of the workpiece undergoing positional deviation due to inertial force. In the present invention, however, the second surface of the workpiece is in close contact with the non-magnetic conveying member due to the magnetic force, so that, if the conveying member is stopped abruptly, the workpiece can be stopped without resulting in any positional deviation. Further, since there is no need to provide a device for preventing the workpiece from going backward or a device for imparting tension, the size of the apparatus can be reduced.

When the non-magnetic conveying member of the present invention is run no return operation is required. Since no return operation is required high-speed conveying is possible, and no violent vibration or noise is involved if the speed is increased.

According to another aspect of the present invention, there is provided a conveying apparatus for conveying a magnetic workpiece having two adjacent surfaces, comprising, a non-magnetic rail having a guide surface for slidably guiding a first surface of the workpiece, a plurality of rollers having peripheral surfaces in rolling contact with a second surface of the workpiece, driving means for causing the rollers to rotate in synchronism in the same direction, and magnets incorporated in the rollers and adapted to generate a magnetic force having a component force for causing the second surface of the workpiece to be attracted to the rollers and a component force for bringing the first surface of the workpiece into contact with the rail.

In the apparatus described above, the magnetic workpiece is directly attracted by the rollers, and the workpiece is conveyed in one direction by rotating the rollers. In this case also, as in the case of the first aspect of the present invention, the workpiece can be conveyed at high speed with low vibration and low noise. Further, positioning can be effected with high accuracy. In addition, the workpiece and the rollers are only in rolling contact with each other, and there is no sliding movement between them, so that wear of the workpiece and the rollers can be prevented.

According to yet another aspect of the present invention, it is desirable that the magnet incorporated in the roller be an axially magnetized permanent magnet, and that a yoke be mounted to at least one pole of this magnet, the guide surface of the rail being positioned near the border portion between one pole of the magnet and the yoke. According to this aspect of the present invention, it is possible to effectively generate a magnetic force having a component force for causing the second surface of the workpiece to be attracted to the roller and a component force for bringing the surface of the workpiece into contact with the rail.

In the present invention, it is desirable that the non-magnetic conveying member be formed of a material which is thin and which has low magnetic permeability so that the magnetic force of the magnet may be efficiently applied to the workpiece through the conveying member.

The magnetic force of the magnet has a component force for bringing the second surface of the workpiece into close contact with the conveying member and a component force for bringing the first surface of the workpiece into contact with the rail. In order to enlarge the force with which the workpiece is held in close contact with the conveying member and to make the sliding friction between the workpiece and the rail as small as possible, it is desirable to determine the position of the magnet such that the component force for bringing the second surface of the workpiece into close contact with the conveying member is larger than the component force for bringing the first surface of the workpiece into contact with the rail.

The present invention is suitable for the conveying of, among other things, a thin plate-like hoop material like a lead frame. In the case of a hoop material, deflection and deformation are apt to be generated when a large load is locally applied. However, in a system in which, as in the case of the present invention, the workpiece is conveyed while being attracted by magnetic force, it is possible to effect high speed conveying without locally applying excessive load to the hoop material.

DESCRIPTION OF THE PREFERRED EMBODIMENTS

Figure 1:
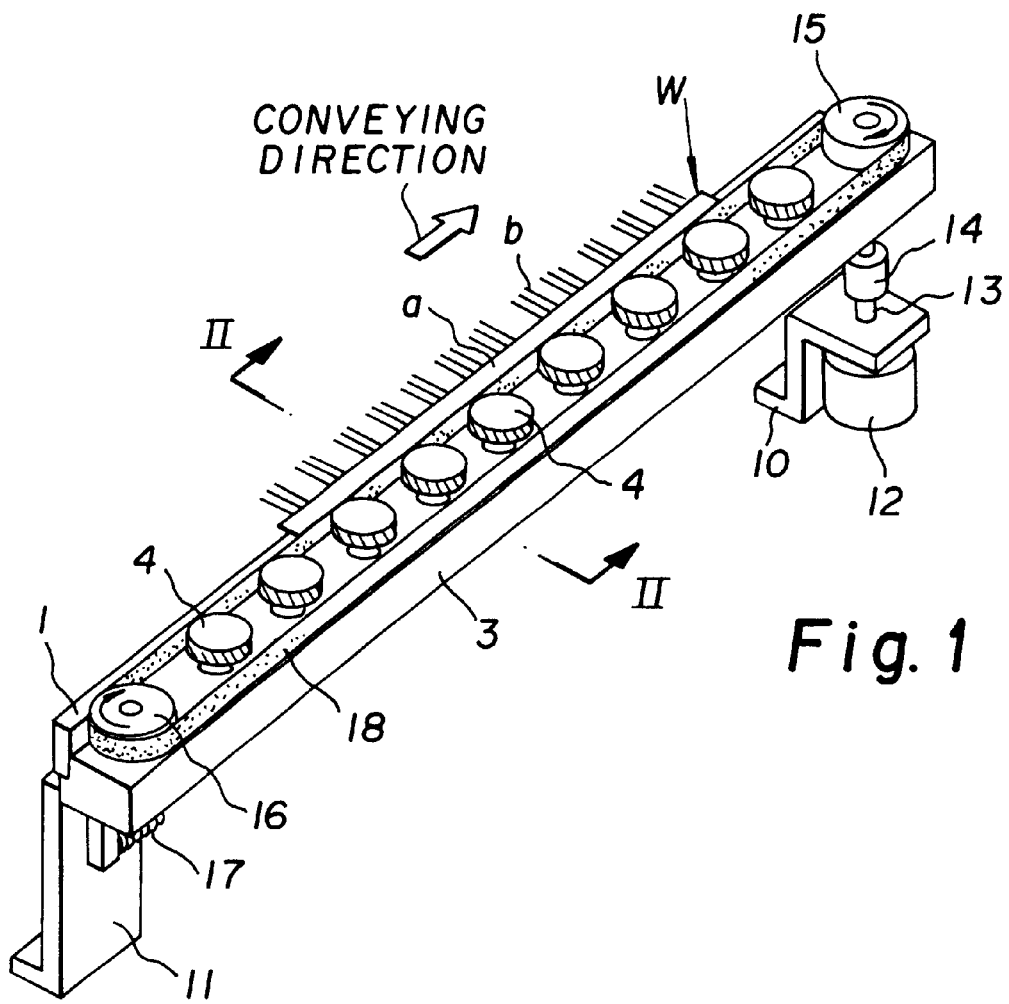
FIG. 1 is a perspective view of a conveying apparatus according to a first embodiment of the present invention.
Figure 2:
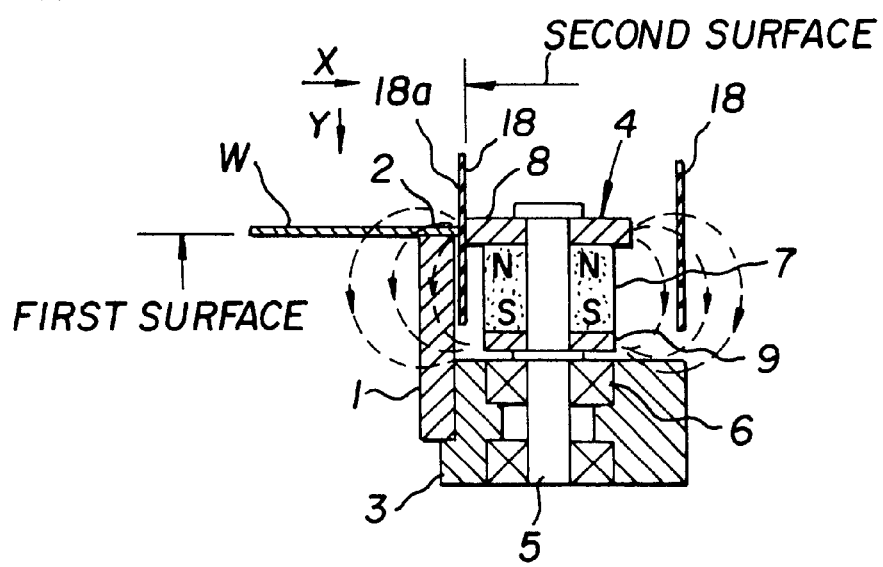
FIG. 2 is a sectional view taken along the line II—II of FIG. 1.

FIGS. 1 and 2 illustrate a conveying apparatus according to the first embodiment of the present invention. This conveying apparatus is used to horizontally convey a lead frame W, which is an example of the workpiece. The lead frame W of this embodiment is stamped from a thin, strip-like magnetic metal plate (hoop material), and has on one longitudinal side a tie bar a having conveying holes and on the other side a plurality of terminal portions b formed integrally and protruding from the tie bar a substantially at right angles.

This conveying apparatus is equipped with a rail 1 slidably supporting the lower surface (first surface) of the tie bar a of the lead frame W. The rail 1 is formed of a non-magnetic material such as stainless steel, aluminum or resin, and the upper surface (guide surface) 2 of rail 1 can be provided with fluororesin coating or the like in order to reduce the frictional resistance between it and the lead frame W. The rail 1 is fastened to a side surface of a rail base 3, which is formed of a non-magnetic material, by means of screws or the like. On the rail base 3, a plurality of rollers 4 are longitudinally arranged at equal intervals.

As illustrated in FIG. 2, each roller 4 is equipped with a rotation shaft 5, which is rotatably mounted to the rail base 3 through the intermediation of a bearing 6. It is desirable to form the rotation shaft 5 of a non-magnetic material. Attached to the upper end portion of the rotation shaft 5 are an axially magnetized cylindrical permanent magnet 7 and yokes 8 and 9. Yokes 8 and 9 are arranged at the poles of this permanent magnet 7. The upper yoke 8 has a larger diameter than the lower yoke 9, and its peripheral surface is in contact with the back surface of a non-magnetic belt 18 described below. The guide surface 2 of the rail 1 is positioned near the upper surface portion of the upper yoke 8. While in this embodiment the yokes 8 and 9 are attached to the two poles of the permanent magnet 7, it is possible to omit the yoke 9 which is on the side where the workpiece W is not attracted.

Referring again to FIG. 1, the longitudinal end portions of the rail base 3 are horizontally supported by support bases 10 and 11. Secured to one support base 10 is a driving motor 12 consisting of a servo motor, pulse motor or the like. The rotation shaft 13 of the motor 12 is connected through a coupling 14 to a driving pulley 15 arranged on the upper surface of one end portion of the rail base 3. On the upper surface of the other end portion of the rail base 3, a rotatable driven pulley 16 is arranged, the rotation axis of this driven pulley 16 being guided so as to be movable in the longitudinal direction of the rail base 3 by a support mechanism (not shown). The rotation shaft of the driven pulley 16 is biased by a tension spring 17 in a direction opposite to the driving pulley 15, imparting a predetermined tension to the non-magnetic belt 18 described below.

The belt 18 consists of a non-magnetic material. The non-magnetic belt 18 runs with tension between the driving pulley 15 and the driven pulley 16 and is driven horizontally. The non-magnetic belt 18 may be a resin belt or a metal belt such as a stainless steel belt. The non-magnetic belt 18 is formed thin, and its conveying surface (outer peripheral surface) 18a is horizontally movable through the gap between the upper yoke 8 and the rail 1. The back surface of the non-magnetic belt 18 is supported by the peripheral surfaces of the rollers 4 (the peripheral surfaces of the yokes 8). The conveying surface 18a of the non-magnetic belt 18 is substantially perpendicular to the guide surface 2 of the rail 1. The end surface of the tie bar a (the second surface) of the lead frame W is in close contact with the conveying surface 18a. The speed at which the lead frame W is conveyed by the non-magnetic belt 18 can be varied through drive control of the motor 12. In addition to continuous conveying, the apparatus can also operate using tact conveying and switching between forward and rearward conveying.

The operation of this conveying apparatus will now be described.

Since the yoke 8 and 9 are arranged at the upper and lower poles of the permanent magnet 7, lines of magnetic force are concentrated in the border portions between the permanent magnet 7 and the yokes 8 and 9, as illustrated in FIG. 2. Since the guide surface 2 of the rail 1 is positioned in the vicinity of the border portion between the upper yoke 8 and the permanent magnet 7, the tie bar a of the lead frame W sliding on the guide surface 2 is arranged at a position where lines of magnetic forces are concentrated, whereby it is most effectively influenced by the magnetic force.

The attracting force of the magnet 7 contained in the roller 4 can generate a component force X for bringing the end surface (second surface) of the tie bar a of the lead frame W into close contact with the non-magnetic belt 18. The attracting force of the magnet 7 can also generate a component force Y for bringing the side surface (first surface) of the tie bar a of the lead frame W into close contact with the rail 1. To bring the lead frame W into close contact with the non-magnetic belt 18 and to make the sliding friction between the lead frame W and the rail 1 as small as possible, the component force X is set so that it is larger than the component force Y. Due to the above attracting force of the magnet 7, the end surface (second surface) of the lead frame W is held in close contact with the roller 4 through the intermediation of the non-magnetic belt 18, and the side surface (first surface) of the lead frame W is held in contact with the guide surface 2 of the rail 1. When the non-magnetic belt 18 is driven, the lead frame W is conveyed integrally with the non-magnetic belt 18, wherein the lead frame W is in sliding contact with the rail 1. Thus, it is possible to maintain a stable attitude if it is conveyed at high speed. Further, since the lead frame W is in contact with the non-magnetic belt 18 substantially over its entire length, it is possible to ensure the contact state over a long distance, so that no large load is locally applied to the lead frame W. Thus, even if the lead frame W is formed of a thin material, it is possible to prevent deformation, warpage, deflection, etc. of the lead frame W. Furthermore, since the non-magnetic belt 18 serving as the conveying member is driven in circulation, it is possible to restrain the generation of vibration or noise as in the case of conventional apparatuses using reciprocating conveying lugs or the like.

Further, since the back surface of the non-magnetic belt 18 is held in rolling contact with the roller 4, it is possible to prevent deflection of the non-magnetic belt 18. Further, since there is no sliding between the non-magnetic belt 18 and the roller 4 (yoke 8), it is possible to prevent them from being worn. Thus, it is possible to improve the durability of the non-magnetic belt 18 and the roller 4, and to always secure a stable conveying position accuracy. Further, since there is substantially no friction between the non-magnetic belt 18 and the roller 4, it is possible to diminish the driving force of the motor 12 for driving the non-magnetic belt 18. Thus, it is possible to realize a small and inexpensive conveying apparatus.

When the non-magnetic belt 18 is stopped, the lead frame W is maintained in the stop position by the magnetic force of the magnet 7, so that, if vibration or impact is applied to it in this condition, the position of the lead frame W does not get out of order, and a high level of positioning accuracy can be achieved. Thus, when this conveying apparatus is used in an electronic components assembly process or characteristic measurement process, there is little variation in the position of the electronic component. Further, since there is no need to provide a device for preventing the lead frame W from going backward or a device for imparting tension, the apparatus can be reduced in size and simplified.

When starting the non-magnetic belt 18 which has been at rest, a predetermined starting torque is necessary due to the friction between the non-magnetic belt 18 and the roller 4. However, since the roller 4 is rotatable, the friction is small, so that the requisite starting torque for the motor 12 is small. Thus, even when the non-magnetic belt 18 is tact-conveyed or when switching between forward and rearward drive is effected, it is possible to drive with a small motor, thereby reducing the starting delay.

Figure 3:
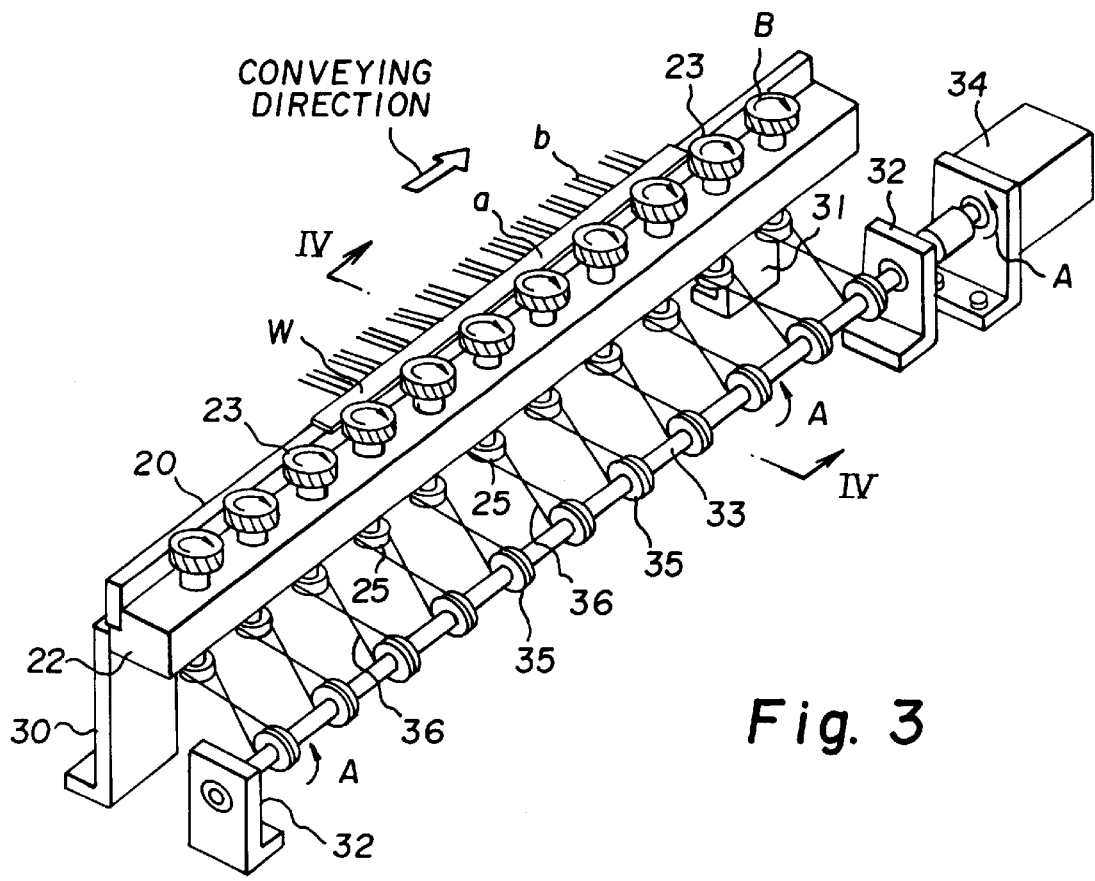
FIG. 3 is a perspective view of a conveying apparatus according to a second embodiment of the present invention.
Figure 4:
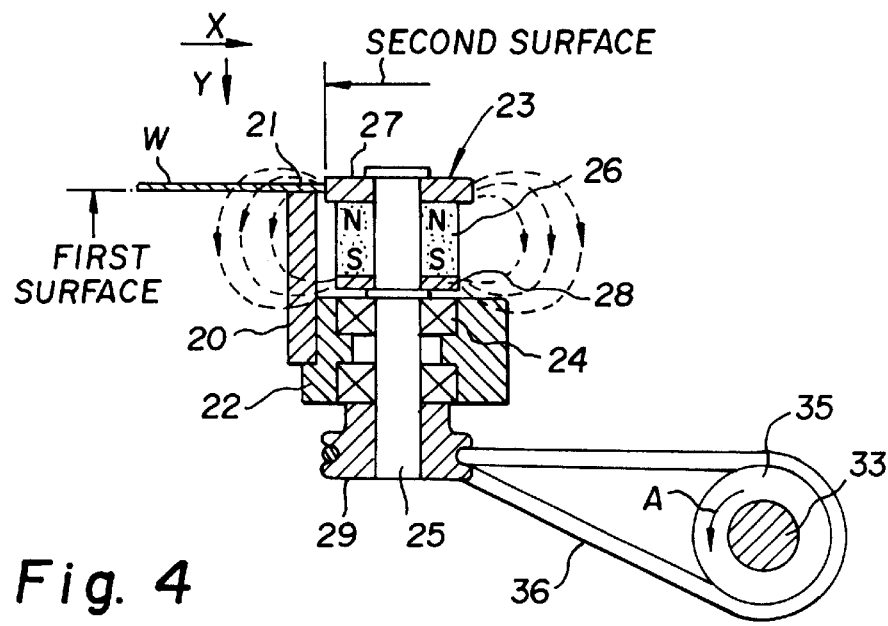
FIG. 4 is a sectional view taken along the line IV—IV of FIG. 3.

FIGS. 3 and 4 illustrate the second embodiment of the present invention.

A rail 20 consisting of a non-magnetic material and having a guide surface 21 is secured to a side surface of a rail base 22 which is formed of a non-magnetic material. On the rail base 22, a plurality of driving rollers 23 are arranged in the longitudinal direction of the rail base 22 at equal intervals. As illustrated in FIG. 4, each roller 23 is equipped with a rotation shaft 25 rotatably mounted to the rail base 22 through the intermediation of a bearing 24. Attached to the upper end portion of the rotation shaft 25 are an axially magnetized cylindrical permanent magnet 26 and yokes 27 and 28 attached to the poles of this permanent magnet 26. It is desirable to form the rotation shaft 25 of a non-magnetic material. The upper yoke 27 has a larger diameter than the lower yoke 28, and its peripheral surface is in contact with the end surface (second surface) of the lead frame W. The guide surface 21 of the rail 20 is positioned in the vicinity of the upper surface portion of the upper yoke 27. A pulley 29 is mounted to the lower end portion of the rotation shaft 25.

The end portions of the rail base 22 are horizontally supported on a table (not shown) by support bases 30 and 31. On the table, a main shaft 33 whose end portions are rotatably supported by bearings 32 is arranged parallel to the rail base 22. A motor 34 is connected to one end portion of the main shaft 33, and rotates the main shaft 33 in the direction of the arrow A. Pulleys 35, which are equal in number to the number of the driving rollers 23, are attached to the main shaft 33 at equal intervals. Belts 36, such as round belts, run between the pulleys 35 and the pulleys 29 which are mounted to the rotation shafts 25 of the rollers 23. Thus, when the main shaft 33 is driven in the direction of the arrow A, all the driving rollers 23 rotate in synchronism in the direction of the arrow B.

In the conveying apparatus constructed as described above, the lead frame W is arranged in the border portion between the yoke 27 and the permanent magnet 26, where, as shown in FIG. 4, lines of magnetic force are concentrated. By such an arrangement the lead frame W is most effectively influenced by the magnetic force. As in the first embodiment, the attracting force due to the magnetic force acting on the lead frame W can be divided into a component force X for bringing the end surface of the lead frame W into close contact with the rollers 23 (yokes 27) and a component force Y for bringing the side surface of the lead frame W into close contact with the rail 20.

When the rollers 23 are driven, the lead frame W is held in sliding contact with the rail 20 and conveyed in the direction of the arrow, while being held in rolling contact with the rollers 23 by the attracting forces X and Y. Thus, even when it is conveyed at high speed, the lead frame can maintain a stable attitude. Further, since the rollers 23 are in close contact with the lead frame W at a plurality of positions, no great load is locally applied to the lead frame W. Thus, even if the lead frame W is formed of a thin material, it is possible to prevent deformation and deflection of the lead frame W. Further, since the lead frame W is in rolling contact with the rollers 23, it is possible to prevent wear by friction between the lead frame W and the rollers 23 (yokes 27). Thus, it is possible to prevent a deterioration in the durability of the rollers 23, and it is possible to ensure a stable conveying position accuracy.

While in the second embodiment the pulleys 29 and 35 and the belts 36 are used to drive the rollers 23 in synchronism, it is also possible, for example, to mount gears to the main shaft 33 and to mount gears in mesh with these gears to the shafts 25 of the rollers 23.

Further, in the second embodiment, it is not necessary for all the rollers to be driving rollers. Some of the rollers may be idle (rotatable) rollers.

While the above embodiments have been described with reference to a single unit, when a plurality of units of FIG. 1 are connected in series, the conveying route is elongated, and it is possible to convey workpieces between a number of processes. In this case, by controlling the motors of the units, the belts of the units can be driven in synchronism. In this way, the addition or deletion of units can be easily effected according to the equipment specifications, whereby the degree of freedom in design can be enhanced.

While in the above embodiments the guide surface slidably guiding the first surface of the workpiece is a horizontal surface and the conveying surface in contact with the second surface of the workpiece is a vertical surface, it is also possible for the conveying surface to be a horizontal surface and for the guide surface to be a vertical surface. Further, there is no need for the guide surface and the conveying surface to be perpendicular to each other. They may make an angle different from the right angle, that is, they may be oblique to each other. Further, one of the two surfaces may be a curved surface.

While in the above embodiments yokes are attached to the two poles of the permanent magnet, it is also possible for the workpiece to be attracted to the guide surface and the conveying surface without using yokes. However, by using yokes, the magnetic force density is enhanced, whereby the workpiece can be attracted more effectively.

The magnet used in the present invention is not restricted to a permanent magnet. It is also possible to use an electromagnet. According to this aspect, the electromagnet can be demagnetized when extracting the workpiece from the conveying apparatus in order to facilitate the extraction of the workpiece.

The workpiece that can be conveyed in the present invention is not restricted to a lead frame having a tie bar on one side as in the embodiments. It is also possible to convey, for example, a pallet as shown in FIG. 9 of Japanese Unexamined Patent Publication No. 9-199516 or a lead frame having a liner portion on either side as shown in FIG. 11 of the same.

Since the non-magnetic conveying member and the driving rollers of the present invention are driven in fixed directions, so that there is no need to perform return operation as in the case of conveying lugs used in conventional apparatuses, whereby it is possible to convey the workpiece at high speed with low vibration and low noise.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claim is:

1. A conveying apparatus for conveying a workpiece having two adjacent surfaces, the conveying apparatus comprising:
    a rail having a guide surface for slidably guiding a first surface of the workpiece;
    conveying means for moving the workpiece along the rail, wherein the conveying means has a conveying surface in contact with a second surface of the workpiece;
    wherein the conveying means comprises at least one rotatable roller, the at least one rotatable roller including a magnet which generates a magnetic force having a component force for causing the second surface of the workpiece to be attracted to said conveying means and a component force for bringing the first surface of the workpiece into contact with the rail.

2. The conveying apparatus of claim 1, wherein the conveying means further comprises:
    a belt in contact with the second surface of the workpiece, the belt being movable along the rail;
    a plurality of rotatable rollers whose peripheral surface is in rolling contact with the surface opposite to the conveying surface of the conveying means;
    wherein each of said plurality of rotatable rollers include a magnet which generates a magnetic force having a component force for causing the second surface of the workpiece to be attracted to said conveying means and a component force for bringing the first surface of the workpiece into contact with the rail.

3. The conveying apparatus of claim 1, wherein the conveying means further comprises:
    a plurality of rotatable rollers having peripheral surfaces in rolling contact with the second surface of the workpiece;
    wherein each of said plurality of rotatable rollers include a magnet which generates a magnetic force having a component force for causing the second surface of the workpiece to be attracted to said conveying means and a component force for bringing the first surface of the workpiece into contact with the rail.

4. The conveying apparatus of claim 1, wherein the magnet is an axially magnetized permanent magnet.

5. The conveying apparatus of claim 1, wherein the magnet is an electromagnet.

6. The conveying apparatus of claim 1,
    wherein a yoke is mounted to at least one of the poles of the magnet, where the guide surface of the rail is positioned in the vicinity of the border portion between one pole of the magnet and the yoke.

7. The conveying apparatus of claim 1, further comprising:
   driving means for causing said conveying means to move the workpiece along the rail.

8. The conveying apparatus of claim 7, wherein the driving means is connected to only one rotatable roller.

9. The conveying apparatus of claim 7, wherein the driving means is connected to a plurality of rotatable rollers.

10. The conveying apparatus of claim 9, further comprising:
    a plurality of pulleys connected to the plurality of rotatable rollers; and
    a main shaft connected to the driving means, wherein the main shaft is connected to the plurality of pulleys by a plurality of belts.

11. A method for conveying a workpiece having two adjacent surfaces, the conveying apparatus comprising:
    slidably guiding, by a rail having a guide surface, a first surface of the workpiece;
    moving the workpiece, by a conveying means, along the rail, wherein the conveying means has a conveying surface in contact with a second surface of the workpiece, and wherein the conveying means comprises at least one rotatable roller, the at least one rotatable roller includes a magnet which generates the magnetic force; and
    generating a magnetic force, at the at least one rotatable roller, having a component force for causing the second surface of the workpiece to be attracted to said conveying means and a component force for bringing the first surface of the workpiece into contact with the rail.

12. The method of claim 11, wherein the conveying means further comprising the steps of:
    contacting the second surface of the workpiece by a belt, the belt movable along the rail;
    making rolling contact with the surface opposite to the conveying surface of the conveying means by a plurality of rotatable rollers whose peripheral surface is in rolling contact with the surface opposite to the conveying surface of the conveying means;
    wherein the rotatable rollers include a magnet which generates the magnetic force.

13. The method of claim 11, wherein the conveying means further comprises:
    making rolling contact with the second surface of the workpiece by a plurality of rotatable rollers having peripheral surfaces in rolling contact with the surface opposite to the conveying surface of the conveying means;
    wherein each of said plurality of rotatable rollers include a magnet which generates the magnetic force.

14. The method of claim 1, the magnetic force is generated by an axially magnetized permanent magnet.

15. The method of claim 11, wherein the magnetic force is generated by an electromagnet.

16. The method of claim 11, further comprising:
    shaping the magnetic force by a yoke is mounted to at least one of the poles of the magnet, and
    positioning the guide surface of the rail in the vicinity of the border portion between one pole of the magnet and the yoke.

17. The method of claim 11, further comprising the steps of:
    moving the conveying means, by a driving means, to move the workpiece along the rail.

18. The method of claim 17, wherein the step of moving the conveying means includes rotating only one rotatable roller.

19. The method of claim 17, wherein the step of moving the conveying means includes rotating a plurality of rotatable rollers.

* * * * *